United States Patent [19]
Guither et al.

[11] Patent Number: 5,316,609
[45] Date of Patent: May 31, 1994

[54] ENCAPSULATING LAMINATOR

[75] Inventors: James E. Guither, Madison; Francis A. Wadzinski, Poynette, both of Wis.

[73] Assignee: Pro-Tech Engineering Co., Inc., Madison, Wis.

[21] Appl. No.: 978,323

[22] Filed: Nov. 18, 1992

[51] Int. Cl.$^5$ ............................................. B32B 31/00
[52] U.S. Cl. .................................. 156/301; 156/552; 156/324; 156/562; 156/556; 156/303; 156/555
[58] Field of Search ............... 156/555, 552, 324, 562, 156/556, 313, 558, 306.6, 65, 301, 302, 303, 379.8, 383

[56] References Cited

U.S. PATENT DOCUMENTS

| | | |
|---|---|---|
| 3,673,019 | 6/1972 | Erekson .............................. 156/552 |
| 3,840,420 | 10/1974 | Sarcia . |
| 3,901,758 | 8/1975 | Humphries . |
| 3,943,031 | 3/1976 | Krueger et al. . |
| 4,496,417 | 1/1985 | Haake et al. . |
| 4,505,772 | 3/1985 | Renz . |
| 4,619,728 | 10/1986 | Brink . |
| 4,888,078 | 12/1989 | Instance .............................. 156/552 |
| 4,995,928 | 2/1991 | Subee . |
| 5,071,504 | 12/1991 | Singer . |
| 5,114,520 | 5/1992 | Wang, Jr. et al. . |
| 5,310,365 | 1/1982 | Elliot .................................... 156/555 |

FOREIGN PATENT DOCUMENTS 0171108 9/1985 Japan .................................. 156/555

*Primary Examiner*—David A. Simmons
*Assistant Examiner*—Mark De Simone
*Attorney, Agent, or Firm*—Lathrop & Clark

[57] ABSTRACT

The apparatus and method employ upper and lower laminating films, having opposed layers of heat activated adhesive. The laminating films are brought together at the surface of an infeed roller which is positioned in front of two opposed heated laminating rollers. The laminating films are brought together at the infeed roller at such angles that an infeed shelf is formed and such that an article may be fed between the upper and lower films as they pass about the infeed roller. The article being laminated may be adjusted until the article has progressed into the nip between the laminating rollers.

16 Claims, 2 Drawing Sheets

ENCAPSULATING LAMINATOR

FIELD OF THE INVENTION

This invention relates to laminating apparatus in general, and in particular to laminators which employ two sheets of film which have opposed surfaces covered in a heat-activated adhesive for heat sealing about a printed sheet of paper or the like.

BACKGROUND OF THE INVENTION

Printed materials such as maps, artwork, advertising, computer printouts, posters and instructional materials benefit from being encapsulated between sheets of clear plastic film. The encapsulation protects the printed material from moisture and soil. It also renders the printed matter less subject to wrinkles, tears and other forms of abuse to which well-used printed materials are often subjected. Clear plastic lamination also improves the appearance of the laminated article giving it a clear, glossy or matte finish. Encapsulation between clear plastic film is a process which an end user of a map or the like may apply to a single copy of a map or other printed work as the user's need for durable copies of improved appearance dictates. Encapsulation of printed materials is also a service sometimes provided to end users by local small businesses which handle jobs as small as a single item to be encapsulated.

Encapsulation of printed documents between plastic sheets allows small- and medium-size printers to supply their full range of printing capabilities in a format with the durability of plastic, this durability being provided by the use of a single additional machine. Thus, a small or medium printer can provide all the capabilities of his printing presses in a durable format with relatively little additional capital cost.

The encapsulation process is normally performed on a machine which has opposed heated rollers. Two sheets of opposed polyester film with a heat-activated adhesive on the opposed faces are wrapped around the heated cylinders where they are Pre-heated and fed through a nip between the heated cylinders. The printed material to be laminated is simultaneously fed through the nip and encapsulated between the two opposed films.

These known laminators have problems associated with single sheet feeding. Once a sheet has been started and gripped by the nip between the laminated rollers, it cannot be adjusted to assure alignment with the laminating films. Thus, any error in alignment may result in the sheet being laminated failing to stay within the confines of the laminating films. Further, the leading edge of the sheet of paper being fed into the nip must be perfectly flat, or the progression of the sheet through the rollers will produce wrinkles. Once engaged by the nip, the sheet cannot be effectively aligned. It is also undesirable for an operator to place his fingers too close to the heated nip.

What is needed is a laminator for encapsulating sheet articles which allows the article to be positioned between the sheets of laminating film sufficiently before the heated laminating rollers to assure proper alignment, to prevent wrinkles and ensure operator safety.

SUMMARY OF THE INVENTION

The encapsulating laminator of this invention employs an upper laminating film and a lower laminating film which are supplied as continuous sheets from supply rolls. The film has two layers, an outer transparent layer with a relatively high melt temperature which serves to protect the encapsulated article, and a low melt temperature inner layer which forms the heat-activated adhesive which bonds the laminating film to the article being encapsulated. The upper and lower laminating films are brought together with their adhesive sides opposed at an infeed roller. The upper film makes contact with the surface of the infeed roller over approximately 90 degrees of the roller circumference, thus frictionally locking it to the roller. The lower film is brought into engagement with the infeed roller only over about 10 to 15 degrees of the circumference of the infeed roller. The lower film as it approaches the infeed roller forms an infeed table which supports the article as it is presented for encapsulation.

After leaving the infeed roller, the opposed laminating films are drawn into the nip of two opposed heated laminating rollers. The path of the laminating films, after leaving the infeed roller, is along a plane which is tangent to both laminating rollers. In order to employ the laminating apparatus, a sheet article is placed on the table formed by the lower laminating film. Static electricity normally present on the lower film causes the sheet to lie along the lower laminating film and to feed past the infeed roller. Because the lower film and the sheet being laminated turn a relatively small angle about the infeed roller, they are not frictionally locked to the infeed roller. Thus, the sheet being laminated may be adjusted to assure alignment with the lower film. The printed sheet to be laminated may be repositioned until one end of it has passed into the nip of the laminating rollers. Between the infeed roller and the laminating rollers, the opposed upper and lower laminating films form an envelope which, together with the infeed roller, insure that the printed sheet or laminated article is wrinkle free as it progresses into the nip of the laminating rollers.

Behind the laminating rolls are two pull rollers which are opposed at a nip, the nip lying in the plane containing the line of tangency between the laminating rollers. Both the laminating rollers and the pull rollers are driven, and the driving relationship between the rollers maintained so the laminated article is held flat and wrinkle free while the heat-activated adhesive cools.

It is an object of the present invention to provide an encapsulating laminator in which an article being encapsulated may be aligned with the encapsulating sheets of plastic film before being laminated therebetween.

It is a further object of the present invention to provide an encapsulating laminator wherein the article to be encapsulated is held flat in a wrinkle-free state before being presented to the laminating rollers.

It is another object of the present invention to provide an encapsulating laminator which prevents contact between the heated rollers and an operator's fingers.

It is also an object of the present invention to provide an encapsulating laminator which facilitates the hand loading of an article to be laminated.

It is yet another object of the present invention to provide an encapsulating laminator that can produce wrinkle-free laminates where the laminated paper has a high moisture content.

It is an additional object of the present invention to provide a method for encapsulating an article between two films of plastic.

Further objects, features and advantages of the invention will be apparent from the following detailed description when taken in conjunction with the accompanying drawings.

DESCRIPTION OF THE PREFERRED EMBODIMENT

Figure 1:
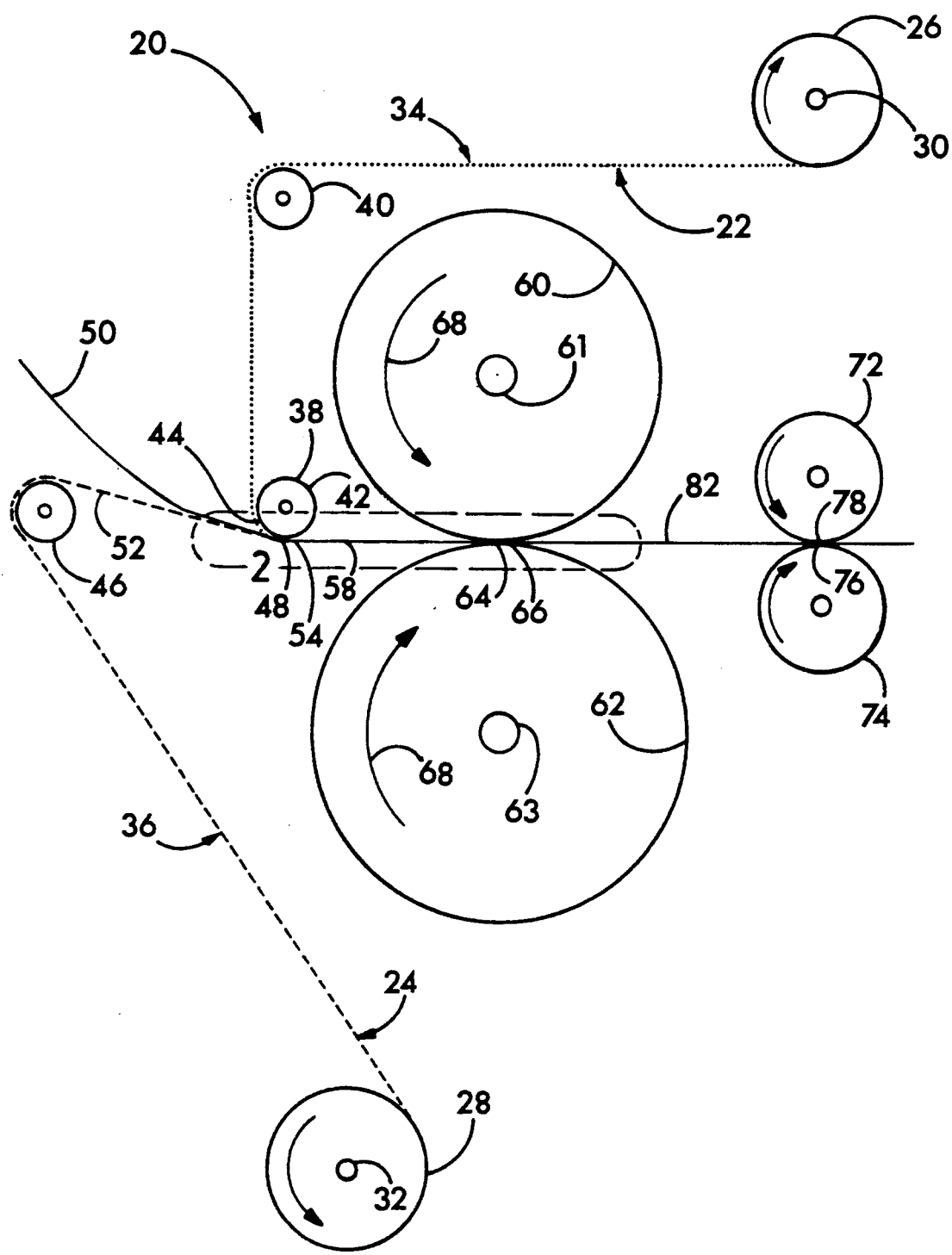
FIG. 1 is a schematic side elevational view of the encapsulating laminator of this invention.
Figure 2:
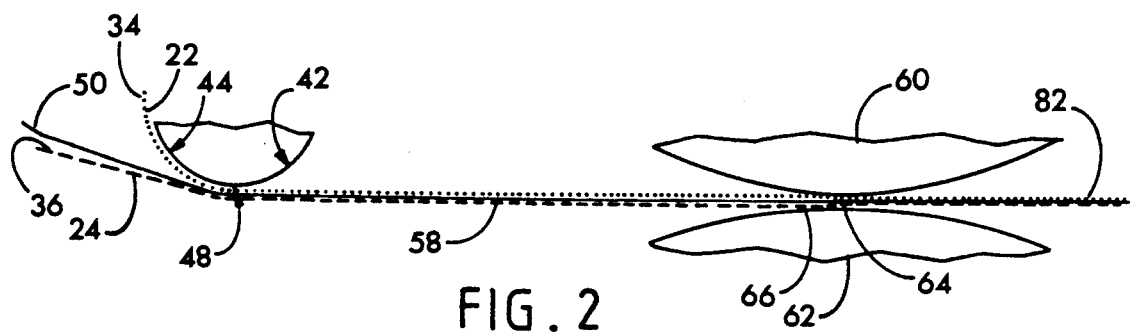
FIG. 2 is an enlarged, fragmentary schematic elevational view of the laminator of FIG. 1.
Figure 3:
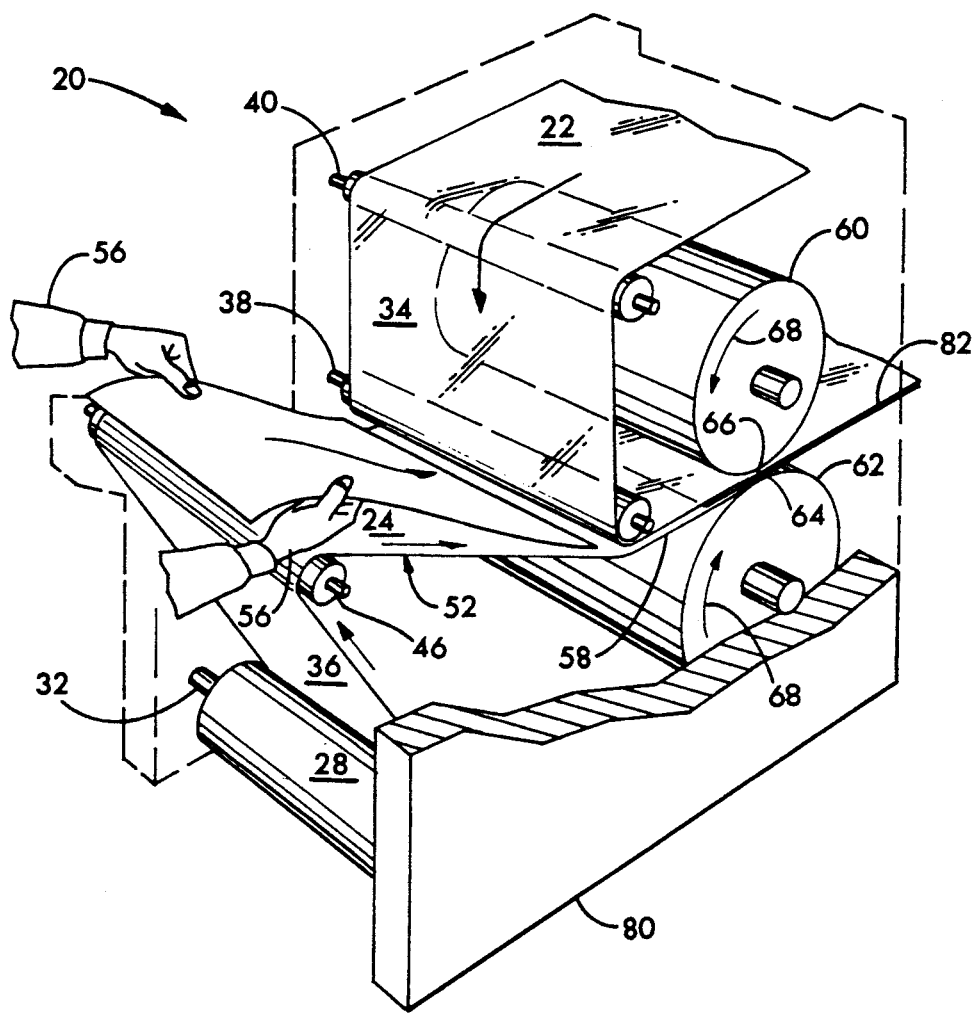
FIG. 3 is fragmentary isometric view, partially broken away, of the encapsulating laminator of FIG. 1 showing a sheet of paper being fed by hand into the laminator.

Referring more particularly to FIGS. 1-3 wherein like numbers refer to similar parts, an encapsulating laminator assembly 20 is shown schematically in FIG. 1. The encapsulating laminator 20 employs an upper laminating film 22 and a lower laminating film 24 for overlying and underlying a sheet article 50 to be encapsulated. The films are supplied as continuous sheets from an upper supply roll 26 and a lower supply roll 28. The upper film 22 is shown schematically in FIGS. 1 and 2 as a line composed of dots, while the lower film 24 is shown schematically as a line composed of dashes. The laminating films 22, 24 have an outer protective layer and an inner heat-activated adhesive layer. The outer layer is preferably composed of a high-melt temperature film such as polyester which has a melt temperature of 450° Fahrenheit. The inner layer is coformed with or applied to the outer layer and is comprised of a low-melting-point plastic, such as polyethylene, with a melt temperature of 165° Fahrenheit. Films having a polyethylene adhesive tend to be of lower cost but are of slightly lower performance than the preferred copolymer adhesive, which is formed of a mixture of polyethylenes of varying densities.

The upper supply roll 26 of laminating film 22 is rotatively mounted on an upper roller 30 which is mounted to the laminator frame 80.

The upper roller 30 will preferably incorporate a clutch (not shown) or the like which will control the amount of tension in the film 22 by providing an adjustment in the amount of force required to unroll the film 22 from the supply roll 26.

Similarly, the lower film 24 is drawn from a supply roll 28 which is mounted on a roller 32 which is mounted to the frame 80 and which employs a clutch system similar to that employed by the upper roller 30. The lower roller clutch may be adjusted independently of the upper roller clutch so that the tension in the upper film 22 and the lower film 24 may be independently adjusted for proper function.

In many laminating applications, the articles to be laminated will be large format printed articles such as maps, photographic displays, or electrostatic printer output. Assistance in properly aligning and positioning such articles is provided by the apparatus 20 which utilizes rollers to direct the laminating films themselves to support and present the article to the overlying films and also to press against the article to remove wrinkles.

The upper film 22 feeds past the upper idler roller 40 and the lower film 24 feet past the lower idler roller 46 and into the nip of the heated laminating rollers. The two films 22, 24 are brought together in generally parallel relation by an infeed roller 38 which is located rearwardly of the lower idler roller 46 and frontwardly of the laminating roller nip. The infeed roller is adapted to bring the upper laminating film into engagement with the lower laminating film at a position forward of the nip and to thus define a region or envelope of overlying film layers adapted to receive a sheet article therebetween for adjustable positioning therein.

The upper film 22 is turned by the upper idler roller 40 to extend generally vertically downward to be engaged by the infeed roller 38. The vertical portion of the upper film 22 extending between the upper idler roller 40 and the infeed roller 38 is thus held away from interference with that portion of the lower film extending between the lower idler roller 46 and the infeed roller 38.

The infeed roller 38 engages against the upper film 22 at a level below that at which the lower film 24 leaves the lower idler roller 46. The vertical displacement between these levels is preferably approximately ¼ inch to ½ inch.

The upper film 22 has a adhesive-side face 34 which is positioned in opposition to the adhesive-side face 36 of the lower film 24 as both films 22, 24 are directed around the infeed roller 38. The upper laminating film 22 is directed by means of the idler roller 40 onto the circumferential surface 42 of the cylindrical infeed roller 38. Because the upper sheet 22 is wrapped around a significant portion 44 of the circumferential surface 42, the upper film 22 is locked in non-sliding engagement with the idler roller 38. The lower film 24 is turned around the lower idler roller 46 and is brought into engagement with the circumferential surface 42 over a relatively narrow area 48, consisting of approximately 10 to 15 degrees of the circumferential surface 42.

The encapsulating laminator 20 directs the path of the upper and lower laminating films 22, 24 about the infeed roller 38 so as to take advantage of the mechanical principles governing the friction between a web and a circular roller. The co-efficient of friction between a web which is turned about a roller of circular cross-sections increases rapidly as the angle of wrap is increased. Thus, the upper film 22 which wraps about a portion 44 of the circumferential surface 42 of the infeed roller 38, which extends for approximately 90 degrees of the circumference of the infeed roller 38, is essentially frictionally locked to the idler roller 38. On the other hand, the lower laminating film 24, while frictionally engaged over a limited circumferential surface 48, is not frictionally locked to the infeed roller 38.

The lower film 24 extends between the lower idler roller 46 and the infeed roller 38 to form a continuous and moving infeed "table" 52. The film forming the table 52 has the unactivated adhesive-side face 36 facing upward. This portion of the lower film is generally horizontal and adapted to receive and support a sheet article placed thereon. When a sheet article 50, such as a sheet of paper, is placed on the infeed table 52, the static charge normally present on the surface 36 of the film 24 causes the paper to lie flat on the portion of the film 24 forming the infeed table 52. The article 50, due to the static charge between the article and the infeed table 52 will, if allowed to, progress to the point 54 where the lower film 24 is tangent to the infeed roller 38. The article 50, as it passes beneath the infeed roller 38 between the opposed films 22, 24, will overwrap the same portion 48 of the idler roller surface 42 as the lower laminating film 24. The article's frictional engagement with the upper and lower films will be governed by the wrap angle of the lower film 24. Thus employing the mechanical principle previously discussed, the article 50, while being held between the opposed upper 22 and lower 24 films, is not locked therebetween, but may be slidably and adjustably repositioned. It should be noted that, even lacking any static charge, the article 50 may be effectively fed between the films 22, 24.

Due to the releasable engagement of the article 50 between the upper and lower films, the operator may position the article 50 with his hands 56 along the film defined infeed table 52 and allow the article 50 to feed past the infeed roller 38 into an envelope 58 formed by the opposed films 22, 24. This envelope extends between the infeed roller 38 and the opposed heated laminating rollers 60, 62. The envelope 58 defines a nonsealingly engaged region of the overlying films which is adapted to receive a sheet article therein for adjustable positioning prior to the admission of the article into the laminating roller nip. The article 50 is held between the opposed films 22, 24 in the envelope 58 and generally retained therein and flattened by the opposed films to reduce warping and wrinkling. The extent to which the article is gripped within the films of the envelope may be adjusted by adjusting the tension on the upper and lower films 22 24 at the supply rollers 30, 32. As the article 50 progresses within the envelope toward the heated rollers 60, 62, the operator may adjust or slide the article 50 with respect to the films 22, 24 to insure the article's 50 alignment with the laminating sheets 22, 24. Thus, the infeed table 52 formed by the lower sheet 24 allows convenient and consistent presentation of the article 50 to engagement between the upper and lower films; while the envelope formed between the upper and lower films, 22, 24, together with the arrangement of the idler rollers 40, 46 and the infeed roller 38 serves to facilitate positioning the article 50 so that it is aligned and free of wrinkles between the opposed sheets 22, 24 before it is laminated.

In a preferred embodiment the distance between the infeed roller 38 and the nip 66 of the laminating rollers 60, 62, and hence the depth of the envelope 58 is approximately 4–6 inches. As measured from the lower idler roller 46 to the infeed roller 38, the depth of the infeed table 52 formed by the lower film may be one inch or longer, but is preferably one to two feet. Generally, for applications involving wider articles to be laminated a greater depth of the infeed table is desirable.

The upper heated laminating roller 60 and the lower heated laminating roller 62 are tangent at a point 64 which defines the midpoint of the nip 66 which is the region between the two heated laminating rollers 60, 62 where the upper film 22 and the lower film 24 are heated and pressed to the article 50, thereby activating the adhesive and causing the article 50 to become laminated therebetween. At least one, and preferably both, of the laminating rollers 60, 62 are driven by means so as to pull the joined laminating films 22, 24 and the article 50 through the nip formed by the laminating rollers 60, 62. The laminating rollers 60, 62 are supported at their ends by movable supports (not shown) capable of urging the rollers towards one another with sufficient pressure to form the nip area 66.

The rollers 60, 62 are rotatably mounted to movable supports (not shown) and the mounts are connected to the frame 80. At least one of the rolls is driven by a drive means, such as a variable speed electric motor or the like (not shown) to cause the rollers 60, 62 to counter-rotate at the desired speed and draw the upper and lower films 22, 24 and the encapsulated article 50 through the nip 66 at the desired rate. Generally, the rollers 60, 62 rotate at a speed sufficient to cause the laminated article to pass through the nip at a rate of about 2 to 10 feet per minute. The rollers are preferably formed of stainless steel, aluminum, or a steel, chromium, and molybdenum alloy which are covered by a thermally conductive silicone rubber coating. The use of a silicone rubber coating on the laminating rolls allows significant deflection about the point 64 where the laminating rollers 60, 62 meet to form the nip 66. The increased nip size reduces the pressure at the center of the nip while providing a larger area for heat transfer between the rollers 60, 62 and the upper and lower laminating films 22, 24. The laminating rollers counter-rotate as illustrated by arrows 68. The line of tangency 64 between the opposed rollers 60, 62 defines a plane of tangency. In the preferred embodiment of the encapsulating laminator 20 shown in FIG. 1, the upper laminating film 22 and the lower laminating film 24 leave the infeed roller 38 along a plane of tangency which is coincident with the plane of tangency of the laminating rollers.

Spaced from the laminating rollers 60, 62 are a pair of pull rollers 72, 74 arranged in a complimentary manner to form a nip area 76 around their line of co-tangency 78. The pull rollers will preferably be mounted to the same frame 80 as the laminating rollers. The pull rollers serve to engage the encapsulated article as it exits from the laminating rollers and to pull the article away from the laminating rollers. The pull rollers 72, 74 exert a force on the encapsulated article while pulling to ensure that the article will remain flat and free of wrinkles after leaving the laminator roller nip.

The pull rollers 72, 74, best shown in FIG. 1, are supported at their ends by movable supports (not shown) capable of urging the pull rollers toward one another with sufficient pressure to engage and tension the laminated article 82 as it moves from the laminating rollers 60, 62 through the pull rollers 72, 74. The pull rollers are preferably spaced sufficiently from the laminating rollers 60, 62 to provide a distance over which the laminated article 82 has time to cool sufficiently to set the adhesive on the adhesive-side faces 34, 36 of the films 22, 24. At least one of the pull rollers 72, 74 is driven by a variable speed electric motor or other similar means. The pull roller line of tangency 78 defines a plane co-tangent to both pull rollers 72, 74, such plane being preferably coplanar with the plane co-tangent to both laminating rollers 60, 62. Thus in the preferred embodiment the film encapsulated article travels along a plane which extends from the infeed roller to the pull rollers.

The preferred film for use with the encapsulating laminator 20 has a total thickness of 0.005 inches or less. Because of the relatively small heating area confined to the nip 66 between the laminating rollers 60, 62, the encapsulating laminator 20 functions best with thin-gauge films. However, thicker films may be accommodated by adjusting the size, speed of rotation, and temperature of the laminating rollers.

The size of the various rollers is not particularly critical. However, larger laminating rollers provide a greater area of nip which allows the laminating of slightly thicker films. The exemplary encapsulating laminator 20, which is adapted for use with films of 0.005 inches or less, could employ laminating rollers 60, 62 of approximately 9 inches in diameter, idler rollers 46, 40, and 38, having diameters of 1 to 2 inches, and pull rollers 72, 74 of approximately 3 inches.

As best shown in FIG. 3, the opposed laminating rollers 60, 62 will preferably differ in size to prevent irregular wear thereon. The encapsulating laminator 20 facilitates the loading of individual sheets of printed material 50 onto the table 52 formed by the lower laminating film 24. The static charge normally present on the laminating film 24 will cause the printed sheet 50 to lie flat against the infeed table 52 and progress toward the infeed roller 38, where it is sandwiched between the opposed films 24, 22 and passes under the infeed roller into the envelope 58 formed between the lower film 24 and the upper film 22. While the printed sheet 50 is held flat and wrinkle free between the opposed sheets 22, 24, it is but lightly clamped between the lower film 24 and the infeed roller 38 such that it may be adjusted and aligned with the lower film 24. Once properly aligned with the lower sheet 24 and free of wrinkles, the article 50 may be released to be laminated between the films 22, 24 by the opposed laminating rollers 60, 62. The laminating apparatus 20 is normally controlled by a foot switch (not shown) or an actuation button mounted on the laminator 20. Thus, where circumstances dictate, the laminator may be stopped between articles to prevent the waste of laminating film or to facilitate the cutting out of a laminated article.

The laminating rollers 60, 62 are heated by heaters 61, 63 which are preferably of the radiant type, preferably employing electrical filaments. It should be understood, where single idler rollers 46, 40 are shown for the proper positioning of film, two or more idler rollers could be used or the supply rolls 26, 28 could be mounted adjustably or non-adjustably, to directly supply the laminating films 24, 22 to the infeed roller 38.

Because the article 50 is not preheated before reaching the nip 66 between the laminating rollers 60, 62, it is not subject to the warping which may be present in some other machines which cause the article to be laminated 50 to be heated, especially when the laminated article has recently been printed and its moisture content, as a result of the requirements of the printing process, is in the neighborhood of 50 to 55 percent, the paper is likely to wrinkle if preheated.

Proper tensioning of the laminating films 24, 22 could be supplied by S-wrap rollers or other means than by the clutch mechanism on the supply roller mountings previously described.

It is understood that the invention is not confined to the particular construction and arrangement of parts herein illustrated and described, but embraces such modified forms thereof that has come within the scope of the following claims.

We claim:

1. An apparatus for encapsulating a sheet article between two laminating films employing heat-activated adhesives, comprising:
    a) a first supply roller adapted to support a roll of upper laminating film;
    b) a second supply roller adapted to support a roll of lower laminating film;
    c) two opposed laminating rollers, at least one of which is heated, the rollers forming a nip therebetween, the opposed rollers being adapted to activate the adhesive upon the laminating films to adhere the upper and lower laminating films to the sheet article, to thereby encapsulate the sheet article between the laminating films;
    d) at least one unheated infeed roller positioned frontwardly of the laminating rollers, wherein the first and second supply rollers are adapted to supply the upper and lower laminating films so as to pass beneath the infeed roller and thence through the nip of the opposed rollers, wherein the infeed roller is adapted to bring the upper laminating film into engagement with the lower laminating film at a position forward of the nip and to define a region of overlying film layers between the infeed roller and the nip adapted to receive a sheet article therebetween for adjustable positioning therein, and wherein a feed path is defined by the lower film between the infeed roller and the nip; and
    e) a lower idler roller positioned frontwardly of the infeed roller which engages the lower film and directs it to the infeed roller, wherein the lower film contacts the infeed roller at an acute angle with respect to the feed path, thereby facilitating feeding of the sheet article into the region of overlying film layers.

2. The apparatus of claim 1 wherein the idler roller is adapted to direct the lower laminating film from the second supply roller to the infeed roller, and adapted to form a lower laminating film shelf which extends between the lower idler roller and the infeed roller, the shelf being adapted to support the sheet article thereon for entry into the film envelope.

3. The apparatus of claim 1, wherein the infeed roller is tangent to a plane of tangency which is tangent to and between both laminating rollers, and wherein the laminating rollers and the infeed roller have axes, all of which are parallel, and wherein the infeed roller is adapted to guide two opposed laminating films parallel to the plane of tangency.

4. The apparatus of claim 1 further comprising two opposed pull rollers, defining a nip at their point of opposition, at least one of said pull rollers being driven, the opposed pull rollers being located rearward of the laminating rollers and adapted to grip in driving relation an encapsulated sheet article exiting from the laminating rollers.

5. The apparatus of claim 4 wherein the pull rollers define a plane tangent to both pull rollers and passing through their nip and wherein said plane is coextensive with a plane tangent to both of the laminating rollers and passing through the nip of the opposed rollers.

6. The apparatus of claim 1, wherein the opposed laminating rollers are both heated, and further comprising at least one means for driving the opposed rollers.

7. The apparatus of claim 1 wherein the opposed rollers have circumferential surfaces which are covered with a silicone rubber.

8. An encapsulating apparatus comprising:
    a) a first supply roller having a supply of an upper heat-activated adhesive film mounted thereon;
    b) a second supply roller having a supply of a lower heat-activated adhesive film mounted thereon;
    c) two opposed heated laminating roller defining a nip therebetween, wherein the upper film and the lower film extend through the nip and are adapted to be attached to a sheet article positioned therebetween;
    d) an infeed roller positioned forward of the laminating rollers, wherein the upper and lower films extend beneath the infeed roller and define a feed path which is tangent to the nip;

e) a lower idler roller forward of the infeed roller and having an upper surface which is above the feed path, wherein the lower film extends from the second supply roller around a portion of the lower idler roller, beneath the infeed roller, and into the nip of the laminating rollers, and wherein the portion of the lower film which extends between the lower idler roller and the infeed roller extends along a plane which intersects the feed path at an acute angle and is adapted to support and position a sheet article positioned thereon to facilitate positionable insertion of the sheet article between the upper film and the lower film; and f) portions of the upper film and the lower film which extend between the infeed roller and the nip of the laminating rollers and which are adjacent and define a nonsealingly engaged region of the overlying films which is adapted to receive a sheet article therein for adjustable positioning prior to the admission of the article into the nip.

9. The apparatus of claim 8 wherein the portions of the upper film and the lower film which extend between the infeed roller and the nip lie substantially in a plane which is cotangent to both laminating rollers.

10. The apparatus of claim 8 further comprising two opposed pull rollers, rearward of the laminating rollers and defining a nip at their point of opposition, wherein at least one of the pull rollers is driven, and wherein the upper film and the lower film extend from the nip of the laminating rollers to the nip of the pull rollers and are driven away form the laminating rollers by the pull rollers.

11. The apparatus of claim 10 wherein the portions of the upper film and the lower film which extend between the laminating rollers and the pull rollers are substantially coplanar with portions of the films which extend between the infeed roller and the laminating rollers.

12. A method of encapsulating a substantially planer article between two sheets of laminating film, comprising the steps of:

a) supplying a lower sheet of laminating film to turn about a lower idler roller and an upper sheet of laminating film to an infeed roller rearward of the idler roller to bring the upper film and the lower film together in parallel relation;

b) directing in a feed direction the parallel sheets of laminating film through a pair of opposed heated rollers spaced rearwardly from the infeed roller;

c) placing a sheet article having a front end and a rear end on the portion of the lower film sheet which extends between the lower idler roller and the infeed roller;

d) feeding the rear end of the article past the infeed roller between the upper laminating film and the lower laminating film forward of the opposed heated rollers;

e) applying a force to the front end of the article to feed the article at a speed which is slower in the direction than the speed of the laminating films to effect slippage of the article with respect to the films to position the article as desired between the sheets; and f) releasing the article, thus allowing it to be fed between the opposed film sheets and sealed therebetween by the heated rollers.

13. An apparatus for encapsulating a sheet article between two film layers, comprising:

a) a frame;

b) a first supply roller rotatively mounted to the frame and adapted to supply an upper film for overlying the article;

c) a second supply roller rotatively mounted to the frame and adapted to supply a lower film for underlying the article;

d) a pair of opposed, rotatable, heated laminating rollers mounted to the frame and meeting at a nip, the laminating rollers being adapted to apply heat and pressure to the laminating films to seal the upper film and the lower film to the sheet article;

e) a lower idler roller mounted to the frame, and adapted to turn the lower film and direct it towards the nip of the laminating rollers;

f) an infeed roller located forward of the laminating roller nip and adapted to engage against the upper film to being the upper film into engagement with the lower film, wherein a feed path tangent to the nip is defined between the infeed roller and the laminating roller nip, and wherein the lower idler roller engages the lower film at a position above the infeed path, such that the sheet article contacts the infeed roller at an acute angle with respect to the feed path, and wherein a sheet article may be adjustably positioned between the upper and lower films forward of the laminating roller nip.

14. The apparatus of claim 13 wherein at least one of the laminating rollers is mounted to the frame for adjustable biasing towards the opposed laminating roller, to permit adjustment of the pressure applied between the laminating rollers.

15. The apparatus of claim 13 wherein the infeed roller is mounted to the frame for adjustable vertical positioning with respect to the upper film.

16. The apparatus of claim 13 wherein the lower idler roller is positioned with respect to the infeed roller such that an upper film will wrap around a greater portion of the infeed roller than the lower film.

* * * * *

UNITED STATES PATENT AND TRADEMARK OFFICE
CERTIFICATE OF CORRECTION

PATENT NO. : 5,316,609
DATED : May 31, 1994
INVENTOR(S) : Guither et al.

It is certified that error appears in the above-indentified patent and that said Letters Patent is hereby corrected as shown below:

In column 10, line 6, of the issued patent, delete "slower in the direction" and substitute --slower in the feed direction-- therefor.

In column 10, line 33, of the issued patent, delete "film to being the" and substitute --film to bring the-- therefor.

Signed and Sealed this

Third Day of September, 1996

Attest:

BRUCE LEHMAN

Attesting Officer    Commissioner of Patents and Trademarks